United States Patent [19]

Baumoel

[11] 4,098,117
[45] Jul. 4, 1978

[54] OPEN CHANNEL FLOW TRANSDUCER FOR SEWERAGE SYSTEM

[76] Inventor: Joseph Baumoel, 107 Columbia Dr., Jericho, Long Island, N.Y. 11753

[21] Appl. No.: 792,103

[22] Filed: Apr. 29, 1977

[51] Int. Cl.² ............................................. G01F 1/66
[52] U.S. Cl. ..................................... 73/194 A; 73/216
[58] Field of Search ................. 73/194 R, 194 A, 201, 73/215, 216, 227, 272 R, 194

[56] References Cited

U.S. PATENT DOCUMENTS

| | | | |
|---|---|---|---|
| 2,283,906 | 5/1942 | Bennett | 73/215 |
| 3,633,417 | 1/1972 | Montague | 73/194 R X |
| 3,906,791 | 9/1975 | Lynnworth | 73/194 A |
| 3,987,674 | 10/1976 | Baumoel | 73/194 A |

*Primary Examiner*—Charles A. Ruehl
*Attorney, Agent, or Firm*—Ostrolenk, Faber, Gerb & Soffen

[57] ABSTRACT

An open channel flow transducer is provided for measurement of the flow of liquid in a sewer pipe or the like which is not always completely filled. A flow tube which may be of plastic has an upwardly extending discharge region connected to a sewer pipe, as by connection to the outlet opening of a sewer pipe which extends into a manhole or other access area. The flow tube therefore becomes filled with liquid before the liquid can be vertically discharged. A flow measuring transducer system is then connected in the flow tube to make a measurement of one or both the flow rate in the tube or the material flowing in the tube by ultrasonic measurement techniques. In one embodiment of the invention, transducers are mounted on the same side of the axis of the flow tube, and the exterior surface of the tube is provided with means to prevent the coherent internal reflection of ultrasonic energy from the interface of the outer tube diameter and the surrounding environment with the desired reflection of energy from the liquid and internal pipe diameter interface. In another embodiment of the invention, the transducers are on opposite sides of the tube and ultrasonic energy is transmitted between them without reflection from an internal wall.

10 Claims, 6 Drawing Figures

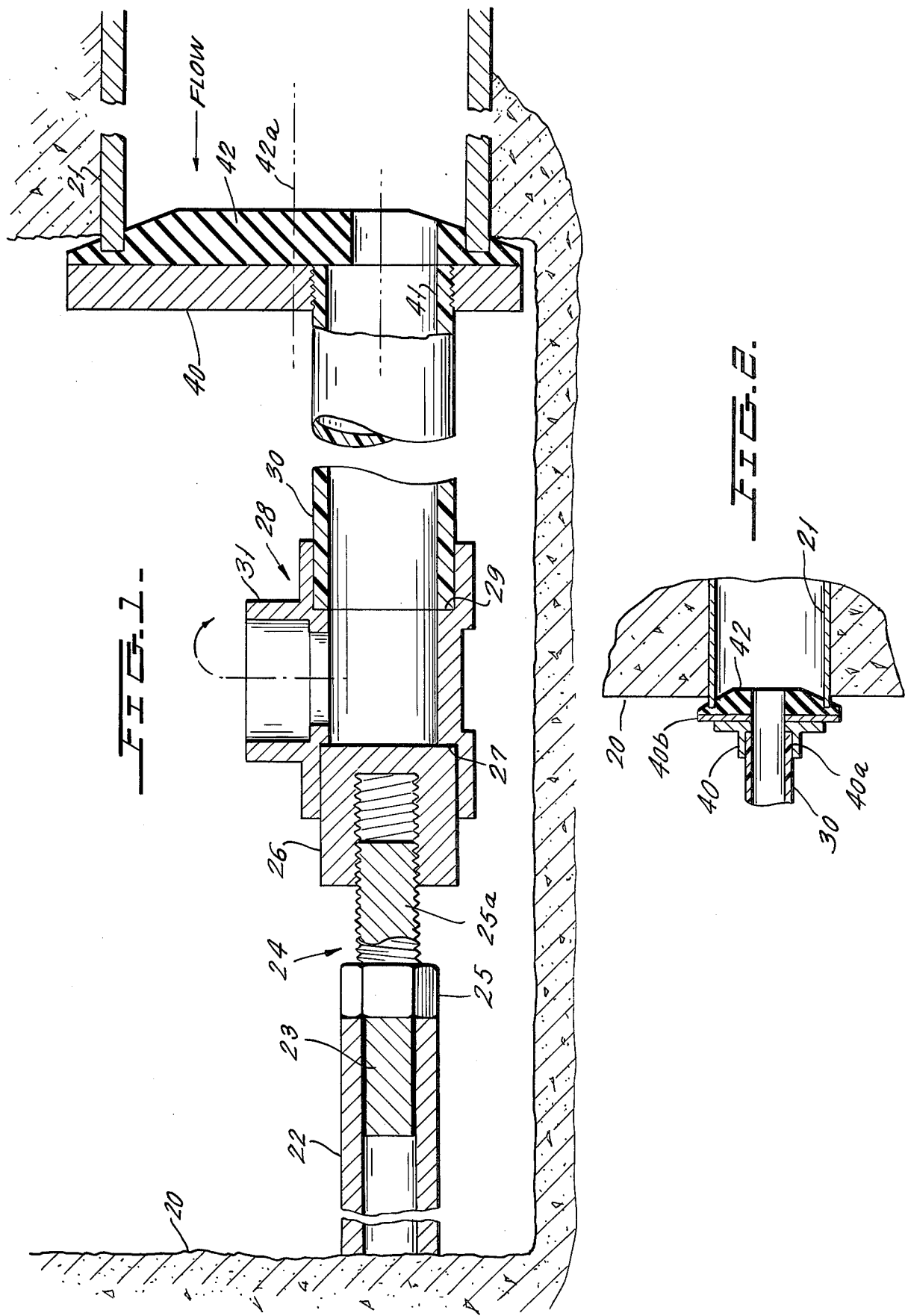

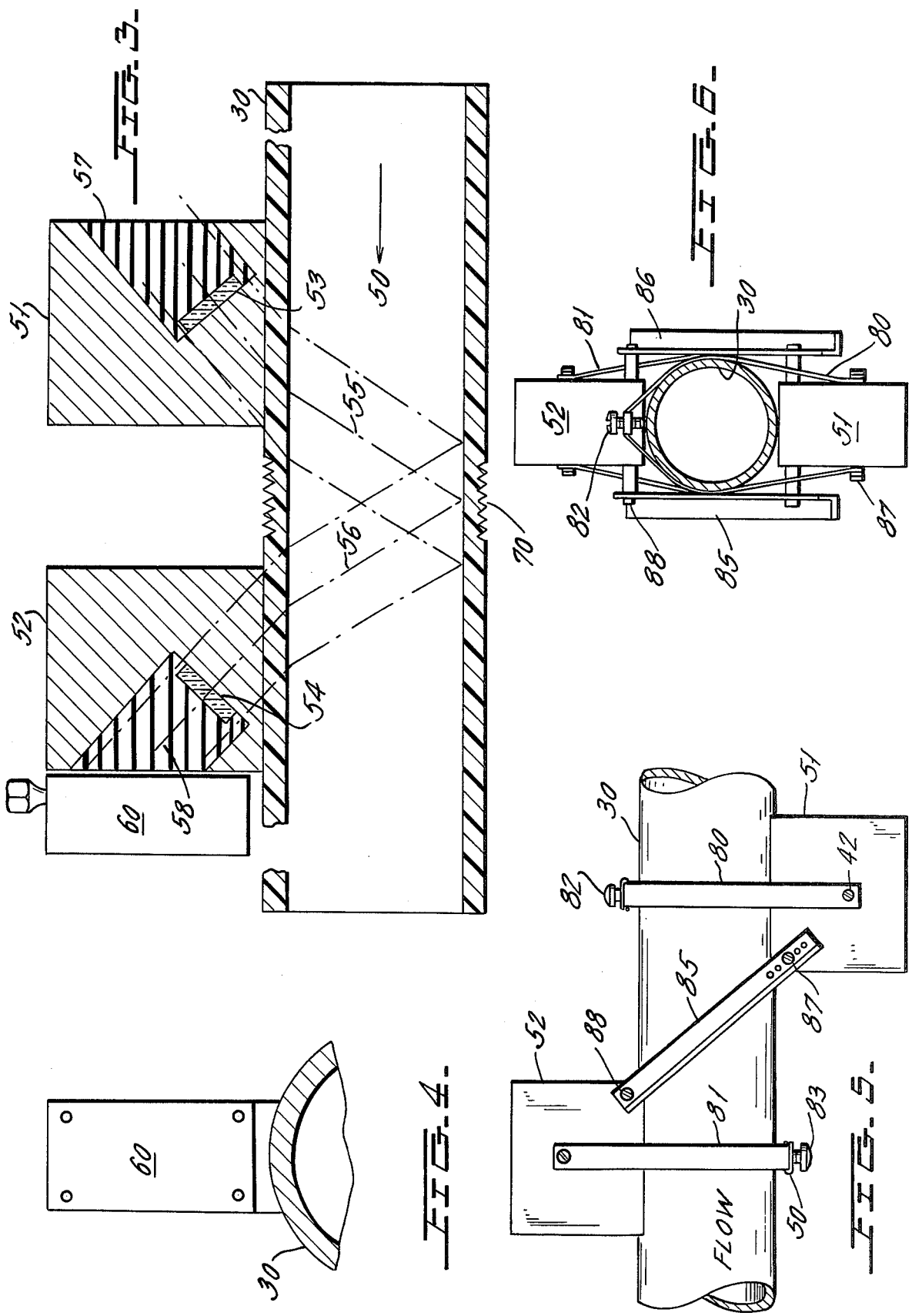

OPEN CHANNEL FLOW TRANSDUCER FOR SEWERAGE SYSTEM

BACKGROUND OF THE INVENTION

This invention relates to a flowmeter for monitoring the flow of liquid in a sewerage system, and more specifically relates to a novel adapter structure for permitting connection of a flowmeter to a sewer pipe, as by connection to the open end or discharge end of the influent sewer pipe within a manhole, and to permit the use of ultrasonic flow measurement techniques even though the sewer pipe is not normally completely filled.

The desirability of measuring flow in a sewerage system is well known and systems for making this measurement are shown, for example, in U.S. Pat. No. 3,633,417, entitled REMOVABLE SEWER CONDUIT FLOWMETER, dated Jan. 11, 1972. Such systems have recognized the need for making the flow rate measurement in a completely filled pipe even though the sewerage pipe might be only partly filled. As shown in the above patent, the discharge from the open end of an influent pipe in a manhole is provided with an adapter structure having an upwardly disposed discharge end to insure that the adapter structure will always be filled with liquid. An impeller flowmeter is then placed within the adapter structure in order to provide a flow measurement which is related to the flow of fluid, whether sewerage or water, in the partially flled sewerage system leading into the manhole.

Arrangements of the prior art have required relatively complex flow control systems for insuring that liquid fills the top of the adapter system by providing gates and the like for damming the end of the pipe containing the measuring equipment.

The present invention provides, in one embodiment, a novel adapter tube construction which can be temporarily or permanently located within the manhole, with the measurement system being secured for operation through the activation of a jack-screw arrangement which is easily installed in the manhole to connect the flow monitor to the influent sewer pipe. A further feature of the invention enables the use of a plastic flow tube which has clamp-on flow monitoring transducers connected thereto, which tube is suitably inserted in the flow path of the sewer pipe. Thus, transducer arrangements and ultrasonic processing circuits of the type disclosed in either of U.S. Pat. Nos. 3,869,915 or 3,987,674, each in the name of Baumoel, can be used in connection with the present invention. The subject matter of each of the above patents in the name of Baumoel are incorporated herein by reference.

A futher important feature of the present invention is that the adapter tube may be made of a plastic material, so that it can be used in a highly reactive environment without danger of corrosion, and yet permits the use of ultrasonic measurement techniques. Thus, the plastic flow tube has a roughened outer periphery to prevent internal ultrasonic reflections from the interface between the outer surface of the tube and the surrounding environment. That is, when using ultrasonic flow measurement techniques (and if the measurement transducers are on the same side of the pipe axis), the portion of the ultrasonic beam used for the measurement is the portion which passes through the liquid, and is reflected from the interior pipe wall. However, and particularly if the pipe is made of plastic rather than metal, a substantial portion of the sound energy through the fluid in the pipe will enter the pipe wall. This energy will then be coherently internally reflected from the outer pipe wall, and can reenter the liquid through the inner pipe wall, and can interfere with the measurement.

In accordance with the invention, a suitable anticoherent reflection means is placed on the outer tube surface to break up the reflection from the surface to destroy its coherency with reflections from the inner pipe wall.

BRIEF DESCRIPTION OF THE DRAWINGS

FIG. 1 partially schematically illustrates a cross-sectional view of the novel adapter structure of the present invention mounted within a sewerage manhole.

FIG. 2 shows a second embodiment of the invention wherein the flow tube of the adapter system is mounted on the same axis as the sewerage pipe.

FIG. 3 is a cross-sectional view through the flow tube of FIG. 1 and illustrates the placement of transducers for an ultrasonic measurement of the fluid flow through the flow tube.

FIG. 4 is an end view of FIG. 3.

FIG. 5 is an elevation view of a second embodiment of the transducer arrangement shown in FIG. 3.

FIG. 6 is an end view of FIG. 5.

DETAILED DESCRIPTION OF THE DRAWINGS

Referring first to FIG. 1, there is shown therein the interior and bottom of a manhole 20 of conventional type which has sewerage pipes leading into the manhole and out of the manhole. Only the pipe 21, which is the influent sewerage pipe leading into the manhole is shown in FIG. 1 and outlet pipes are also provided but are not shown. Influent sewerage pipe 21 carries either sewage or rainwater or both and is not always completely filled.

It is frequently desirable to measure the flow of the fluid out of pipe 21 and to monitor the kind of material, whether sewerage or rainwater, which is flowing in the pipe. The present invention provides a novel adapter structure for permitting the removable connection of an ultrasonic transducer to the pipe 21 in order to monitor the flow of fluid therefrom without interfering with flow in the sewerage system in any way. Note, however, that the monitor of the invention could be connected at any desired point in a sewerage system.

The adapter structure shown in FIG. 1 consists of a steel or plastic pipe 22 which may have any desired diameter. A jack-screw assembly 24 is then provided which consists of cylindrical rod section 23, a nut section 25, a threaded screw section 25a and a blind nut 26. Rod 23, nut 25 and screw 25a are integral parts which may be machined from a hexagonal rod. Cylindrical section 23 fits into the interior of pipe 22, as shown, and is free to rotate relative to pipe 22. Screw 25a threadably enters blind nut 26. Thus, when nut 25 is rotated, pipe 22, which has any suitable length, can be forced against the interior wall of manhole 20.

The blind nut 26 is received against the circular shoulder 27 formed in the end of T-cross-section member 28. The T-member 28 has a further circular shoulder 29 which receives one end of a cylindrical flow tube 30 and has an upwardly extending discharge section 31 through which fluid may flow out of the T-member 28 and into the interior of the manhole 20.

The right-hand end of flow tube 30, which will be described in more detail in connection with FIG. 3 hereinafter, is connected to a cylindrical flange 40 which may be of steel or plastic and which is connected to the tube 30 in any desired manner as by a threaded connection or as by welding or by compression, or the like. Tube 30 and the other components of the adapter may be of any desired material, but preferably will be of material which can resist the corrosive action of the environment. Tube 30 specifically may be of a plastic, such as polyvinyl chloride.

Flange 40, as shown in FIG. 1, has an opening 41 which is off-center relative to the center line 42 of the main sewerage conduit 21. The flange 40 has a foam rubber dam 42 secured thereto which is pressed against the outer periphery of the end of conduit 21, or sealed against the internal surface of conduit 21, thereby to form a seal about the conduit 21. Consequently, all flow of liquid from the conduit 21 into the manhole 20 must pass through the flow tube 30. The flow into flow tube 30 must discharge from the flow tube by passage through the upwardly extending discharge end 31 of T-member 28. Consequently, the full interior of the tube 30 must be filled with liquid before liquid can discharge from end 31 into the manhole 20 and then out through suitable discharge conduits extending from the manhole.

A flow measuring transducer arrangement is then connected to the flow tube 30 as will be later shown in connection with FIGS. 3 to 6. The novel adapter arrangement shown in FIG. 1, however, can be used in connection with any desired type of transducer and has the advantage of simplicity of construction and ease of connection to the pipe 21. The assembly of FIGS. 1 and 2 can be installed in the manhole 20 when a flow reading is desired, or it can be fixed permanently in place and the jack-screw system 24 can be adjusted such that nut 26 is moved fully to the left, thereby to remove the flange 40 and foam rubber dam 42 substantially from the end of the conduit 21 to insure a free flow or discharge of fluid from the conduit 21 into the manhole. In either case, when a flow measurement is desired, it is only necessary to open the manhole and to operate the nut 25 of the jack-screw assembly 24 to move nut 26 to the right, thereby to force the assembly and the foam rubber dam 42 into engagement with the free end of conduit 21. Fluid will then have to flow through the flow tube 30 and will have to discharge through the upper end 31 of the T-member 28. The transducer structure on flow tube 30 can then make the necessary measurement.

In FIG. 1, the center line of flow tube 30 is off-set relative to the center line 42 of the pipe 21. FIG. 2 illustrates an arrangement whereby the center line of flow tube 30 is coaxial with the center line of the conduit 21. FIG. 2 also illustrates the flange 40 as having an axial projecting section 40a, which could have also been used in the arrangement of FIG. 1, for ease of connection between the flange 40 and the tube 30. FIG. 2 also illustrates a pressure plate 40b disposed between the flange 40 and the foam rubber dam 42. Any other means could be used to seal the adapter against pipe 21, including inflatable seals, foam rubber cones, and the like.

FIGS. 3 and 4 illustrate the flow tube 30 with one type of clamp-on measuring transducer means for making an ultrasonic measurement of the flow of liquid through the tube 30 in the direction of the arrow 50. Thus, in FIG. 3, two axially spaced transducer housings 51 and 52 receive transducer crystals 53 and 54, respectively, which are disposed at an angle to the axis of conduit 30 such that each will transmit ultrasonic energy into the pipe 30 in a direction shown by the ultrasonic energy rays 55 and 56, which rays define an angle of about 30° to a normal to the axis of tube 30. Transducer crystals 53 and 54 may be held in place within the transducer housings 51 and 52, respectively, as by the insulation potting compounds 57 and 58, respectively, in the manner disclosed in U.S. Pat. No. 3,987,674 referred to above.

The transducer housings 51 and 52 are connected to the pipe 30 and any suitable coupling fluid may be used to insure the coupling between the two bodies. Flow measuring equipment of the type disclosed in either of U.S. Pat. Nos. 3,869,915 or 3,987,674 may then be connected to the terminals of transducer crystals 53 and 54. These terminals may, if desired, be available for connection at a terminal block 60 of any suitable nature where personnel making the fluid measurement will simply connect the flow monitoring electronics to these terminals when a flow measurement is to be made.

Any desired electronics measurement system can be used wherein ultrasonic energy from transducer crystal 53 passes through the fluid in the direction of fluid flow 50 and is received by the transducer crystal 54 and the time taken for the trip from transducer 53 to transducer 54 is measured. Transducer 54 then produces output energy which travels along the lines of rays 56 and 55 but travels upstream of the fluid flow 50 and the time taken for energy to reach transducer crystal 53 traveling upstream of flow 50 is measured. The upstream travel time of the ultrasonic energy is then electronically compared to its downstream travel time between transducer crystals 53 and 54 and this time difference is a measure of the flow rate of the fluid in the conduit 30.

In accordance with an important feature of the present invention, the outer surface of flow tube 30 is tooled as by providing a thread or parallel grooves 70. The purpose of these grooves or tooling 70, which can be replaced by any desired roughening of the outer surface of the conduit 30, is to prevent coherent internal reflections of ultrasonic energy from the interface between the outer surface of tube 30 and the exterior environment which might interfere with the ultrasonic measurement being made on the basis of reflections from the inner diameter of tube 30.

In a typical embodiment of the invention, tube 30 may have an outer diameter of about 4 inches and an inner diameter of about 3¼ inches and a length of about 12 inches. The tub 30 may have a diameter equal to the diameter of pipe 21, or may have a diameter as little as about one-fourth the diameter of pipe 21. The transducer housings 51 and 52 may each have a length along the axis of tube 30 of about 1⅞ inches and are spaced from one another by about 2 inches. The anti-coherent reflection tooling 70 is disposed at the center of conduit 30 and is about 1 inch in length and the tooling grooves are about 3/32 of an inch deep. Typically, the walls of grooves 70 form an angle of about 40° to the axis of tube 30. These grooves are located along the portion of tube 30 at which ultrasonic energy rays are reflected during their passage from transducer 51 to transducer 52.

FIGS. 5 and 6 show a second embodiment of the transducer arrangement shown in FIGS. 3 and 4, wherein the conduit 30 has the transducers 51 and 52 mounted on opposite sides of the axis of the pipe 30 in the manner shown in U.S. Pat. No. 3,987,674. Thus, as shown in FIGS. 5 and 6, transducers 51 and 52 are fixed to the flow tube 30 by fastening straps 80 and 81, respectively, which are tensioned against tube 30 by adjustment screws 82 and 83, respectively. The transducer housings 51 and 52 are then suitably spaced from one another by a fixed axial distance by the side braces 85 and 86, respectively, which are fixed to one another and to the transducer housings 51 and 52, respectively, by the screw connectors 87 and 88, respectively. Again, suitable terminals (not shown) enable the connection of electronics to the transducer crystals within the transducer housings 51 and 52 in FIGS. 5 and 6. Since ultrasonic energy is not reflected from the pipe wall in traveling between transducers, it is not necessary to provide the tooling 70 on tube 30 in FIGS. 5 and 6.

Although there has been described a preferred embodiment of this invention, many variations and modifications will now be apparent to those skilled in the art. Therefore, this invention will be limited, not by the specific disclosure herein, but only by the appended claims.

The embodiments of the invention in which an exclusive privilege of property is claimed are defined as follows:

1. A flow transducer for a sewerage system; said flow transducer comprising, in combination: a flow tube; connection means connected to one end of said flow tube for connecting and sealing said flow tube to the interior of a horizontal and relatively large diameter sewer pipe; flow discharge means connected to the opposite end of said flow tube for discharging liquid flow from said flow tube at a height vertically above said flow tube, thereby to insure that said flow tube is filled with liquid; and ultrasonic flow measuring means connected to said flow tube for measuring the flow of liquid therethrough; said sewer pipe comprising the influent sewer pipe disposed to discharge liquid into a manhole; said transducer being removably fixed within said manhole; said connection means comprising a seal securable across the end of said influent sewer pipe, which seal contains an opening in communication with said flow tube; and pressure means connected to said opposite end of said flow tube for applying pressure between the interior wall of said manhole and said flow tube to press said seal into contact with said influent sewer pipe.

2. The flow transducer of claim 1 which further includes jack-screw means for said pressure means, operable to fix said flow tube within said manhole and in communication with said influent sewer pipe.

3. The flow transducer of claim 1 wherein said flow discharge means is a T-shaped member in cross-section having an upwardly extending discharge outlet, and horizontally extending arms respectively receiving said pressure means and said flow tube, and having a flow channel extending from said flow tube to said discharge outlet.

4. The flow transducer of claim 3 which further includes jack-screw means for said pressure means, operable to fix said flow tube within said manhole and in communication with said influent sewer pipe.

5. The flow transducer of claim 1 wherein said ultrasonic flow measuring means comprises transducer means clamped onto the outer surface of said flow tube.

6. The flow transducer of claim 5 wherein said transducer means comprises first and second axially spaced transducers.

7. The flow transducer of claim 6 wherein said first and second transducers are on the same side of said flow tube.

8. The flow transducer of claim 6 wherein said first and second transducers are on opposite sides of said flow tube.

9. The flow transducer of claim 6 wherein said flow tube is of a plastic material, and wherein at least portions of the outer surface of said flow tube between said first and second transducers contains anti-coherent ultrasonic reflection means thereon.

10. A flow transducer for a sewerage system; said flow transducer comprising, in combination: a flow tube; connection means connected to one end of said flow tube for connecting and sealing said flow tube to the interior of a horizontal and relatively large diameter sewer pipe; flow discharge means connected to the opposite end of said flow tube for discharging liquid flow from said flow tube at a height vertically above said flow tube, thereby to insure that said flow tube is filled with liquid; and ultrasonic flow measuring means connected to said flow tube for measuring the flow of liquid therethrough; said transducer means comprising first and second axially spaced transducers; said flow tube being of a plastic material; at least portions of the outer surface of said flow tube between said first and second transducers containing anti-coherent ultrasonic reflection means thereon.

* * * * *